US010979601B2

(12) United States Patent
Froehlich et al.

(10) Patent No.: US 10,979,601 B2
(45) Date of Patent: Apr. 13, 2021

(54) HIGH PRECISION GAMUT MAPPING

(71) Applicants: Dolby Laboratories Licensing Corporation, San Francisco, CA (US); DOLBY INTERNATIONAL AB, Amsterdam Zuidoost (NL)

(72) Inventors: Jan Froehlich, Munich (DE); Robin Atkins, San Jose, CA (US)

(73) Assignees: Dolby Laboratories Licensing Corporation, San Francisco, CA (US); Dolby International AB :, Amsterdam Zuidoost (NL)

( * ) Notice: Subject to any disclaimer, the term of this patent is extended or adjusted under 35 U.S.C. 154(b) by 260 days.

(21) Appl. No.: 16/091,176

(22) PCT Filed: Mar. 31, 2017

(86) PCT No.: PCT/US2017/025566
§ 371 (c)(1),
(2) Date: Oct. 4, 2018

(87) PCT Pub. No.: WO2017/176594
PCT Pub. Date: Oct. 12, 2017

(65) Prior Publication Data
US 2020/0329174 A1 Oct. 15, 2020

Related U.S. Application Data

(60) Provisional application No. 62/317,778, filed on Apr. 4, 2016.

(30) Foreign Application Priority Data

Apr. 4, 2016 (EP) .................................... 16163720

(51) Int. Cl.
*H04N 1/60* (2006.01)

(52) U.S. Cl.
CPC ......... *H04N 1/6061* (2013.01); *H04N 1/6008* (2013.01); *H04N 1/6019* (2013.01)

(58) Field of Classification Search
CPC ......................................... H04N 1/6058–6069
See application file for complete search history.

(56) References Cited

U.S. PATENT DOCUMENTS

| 5,731,818 A | 3/1998 | Wan |
| 6,516,089 B1 | 2/2003 | McCann |
| (Continued) | | |

FOREIGN PATENT DOCUMENTS

| CN | 102209179 | 10/2011 |
| WO | 2010/039185 | 4/2010 |
| (Continued) | | |

OTHER PUBLICATIONS

Morovic, J. et al "Non-Iterative Minimum AE Gamut Clipping" Color and Imaging Conference, vol. 2001, No. 1, Society for Imaging Science and Technology, Jan. 2001.

(Continued)

*Primary Examiner* — Scott A Rogers

(57) ABSTRACT

Methods and systems for gamut mapping are disclosed. Pixels of an image or points of a look-up-table can be gamut mapped in a multi-step iterative process, by generating a coarse gamut hull and calculating a value of a distance metric for out-of-gamut pixels or LUT points, and subsequently generating a fine gamut hull in the neighborhood of the coarse gamut hull points closest to the out-of-gamut pixel or LUT points under consideration. The out-of-gamut pixel or LUT point is gamut mapped based on the smallest distance metric value calculated.

16 Claims, 4 Drawing Sheets

(56) References Cited

U.S. PATENT DOCUMENTS

| | | | |
|---|---|---|---|
| 7,233,413 B2 | 6/2007 | Jones | |
| 8,125,685 B1 * | 2/2012 | Borg | H04N 1/6058 |
| | | | 358/1.9 |
| 8,207,982 B2 | 6/2012 | Tin | |
| 8,238,004 B2 | 8/2012 | Ito | |
| 8,520,938 B2 | 8/2013 | Rozzi | |
| 8,542,402 B2 | 9/2013 | Tin | |
| 8,610,948 B2 | 12/2013 | Tin | |
| 8,643,922 B2 | 2/2014 | Dalrymple | |
| 9,936,199 B2 | 4/2018 | Froehlich | |
| 2006/0119870 A1 | 6/2006 | Ho | |
| 2009/0128835 A1 | 5/2009 | Yao | |
| 2010/0086226 A1 | 4/2010 | Rozzi | |
| 2011/0134447 A1 | 6/2011 | Mestha | |
| 2011/0305389 A1 * | 12/2011 | Maltz | G06T 11/001 |
| | | | 382/167 |
| 2013/0265593 A1 | 10/2013 | Maltz | |
| 2020/0162639 A1 * | 5/2020 | Gonsor | H04N 1/6061 |

FOREIGN PATENT DOCUMENTS

| | | |
|---|---|---|
| WO | 2014/132096 | 9/2014 |
| WO | 2016/049327 | 3/2016 |

OTHER PUBLICATIONS

ITU-R BT.2390-0 "High Dynamic Range Television for Production and International Programme Exchange" 2016.

* cited by examiner

HIGH PRECISION GAMUT MAPPING

TECHNICAL FIELD

The present disclosure relates to digital image processing. More particularly, it relates to high precision gamut mapping method.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
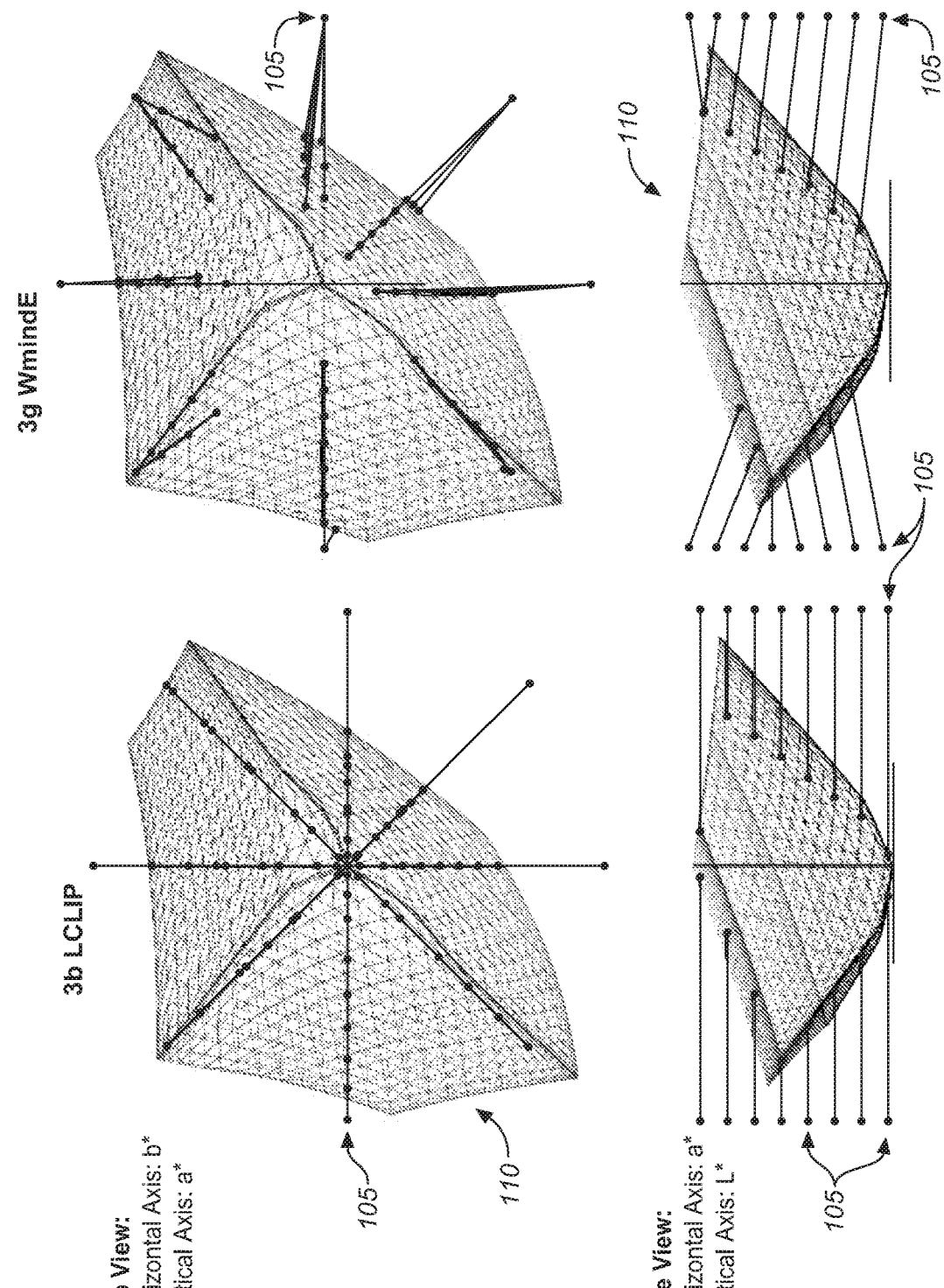
FIG. 1 illustrates a specific gamut as grid and the mapping of colors that are outside this gamut towards points on the gamut surface using two different exemplary gamut mapping algorithms, 'LCLIP' and 'WmindE' (both gamut mapping algorithms are prior art).

In a first aspect of the disclosure, a computer-implemented method is described for gamut mapping from a gamut mapping color space to a target color space, the method comprising: providing, by a computer, an image in the gamut mapping color space, the image comprising a plurality of pixels; determining for the plurality of pixels, by the computer, out-of-gamut (OOG) pixels, based on a gamut of a target device; generating, by the computer, a coarse gamut hull comprising IG points in a course grid having an m-bit resolution, wherein m is an integer number, the course grid being defined in the target color space; converting, by the computer, the coarse gamut hull to the gamut mapping color space; calculating, by the computer, for at least one OOG pixel a plurality of values of a coarse distance metric between the at least one OOG pixel and each of a plurality of coarse gamut hull points in the coarse grid of IG points, wherein calculating the coarse distance metric values is carried out in the gamut mapping color space; among the plurality of coarse gamut hull points, calculating, by the computer, u coarse gamut hull points having a smaller coarse distance metric value than other coarse gamut hull points of the plurality of coarse gamut hull points, wherein u is an integer number, e.g. determining the u coarse gamut hull points corresponding to the u smallest coarse distance metric values; for each of the u coarse gamut hull points, generating, by the computer, a fine gamut hull comprising IG points in a neighborhood of each of the u coarse gamut hull points, in a fine grid having a q bit resolution, wherein q is an integer number higher than m, the fine grid being a regular grid in the target color space; converting, by the computer, the fine gamut hull to the gamut mapping color space; calculating, by the computer, for the at least one OOG pixel a plurality of values of a fine distance metric between the at least one OOG pixel and each of a plurality of fine gamut hull points in the fine grid of IG points, wherein calculating the fine distance metric values is carried out in the gamut mapping color space; calculating, by the computer, a smallest distance metric value among the calculated fine distance metric values; and gamut mapping, by the computer, the at least one OOG pixel to an IG pixel based on the calculated smallest distance metric value.

In a second aspect of the disclosure, a computer-implemented method is described for generating a look-up-table (LUT) for gamut mapping images from a gamut mapping color space to a target color space, the method comprising: providing, by a computer, a LUT for a target device, the LUT comprising a plurality of LUT points in the gamut mapping color space to be mapped to the target color space; determining for the plurality of LUT points, by the computer, out-of-gamut (OOG) LUT points, based on a gamut of the target device; generating, by the computer, a coarse gamut hull comprising IG points in a coarse grid having an m-bit resolution, wherein m is an integer number, the course grid being a regular grid defined in the target color space; converting, by the computer, the coarse gamut hull to the gamut mapping color space; calculating, by the computer, for at least one OOG LUT point a plurality of values of a coarse distance metric between the at least one OOG LUT point and each of a plurality of coarse gamut hull points in the coarse grid of IG points, wherein calculating the coarse distance metric values is carried out in the gamut mapping color space; among the plurality of coarse gamut hull points, calculating, by the computer, u coarse gamut hull points having a smaller coarse distance metric value than other coarse gamut hull points of the plurality of coarse gamut hull points, wherein u is an integer number, e.g. determining the u coarse gamut hull points corresponding to the u smallest coarse distance metric values; for each of the u coarse gamut hull points, generating, by the computer, a fine gamut hull comprising IG points in a neighborhood of each of the u coarse gamut hull points, in a fine grid having a q bit resolution, wherein q is an integer number higher than m, the fine grid being a regular grid defined in the target color space; converting, by the computer, the fine gamut hull to the gamut mapping color space; calculating, by the computer, for the at least one OOG LUT point a plurality of values of a fine distance metric between the at least one OOG LUT point and a plurality of fine gamut hull points in the fine grid of IG points, wherein calculating the fine distance metric values is carried out in the gamut mapping color space; calculating, by the computer, a smallest distance metric value among the calculated fine distance metric values; gamut mapping, by the computer, the at least one OOG LUT point to an IG point based on the calculated smallest distance metric value; and generating the LUT for gamut mapping by including the IG point as value of the at least one OOG LUT point.

In a third aspect of the invention, a non-transitory computer-readable storage medium is described, having stored thereon computer-executable instructions for executing any of the methods described in the present disclosure.

In a fourth aspect of the invention, an apparatus is described, configured to implement any of the method described in the present disclosure.

DETAILED DESCRIPTION

The present disclosure describes a method for hierarchical gamut mapping using limited memory resources. The method is based on a coarse sampling step to identify the region for optimal color mapping and subsequently proceeds with a finer sampling to identify the final mapping in a multi-step procedure.

The present disclosure describes methods that can applied to a variety of applications involving gamut mapping, comprising image and video processing, such as in the film and TV industry or traditional printing. For example, the methods of the present disclosure can apply to printers, ranging from small home printers to large wide format printing machines. In another example, the methods of the present disclosure apply to displays.

As understood by the person of ordinary skill in the art, gamut mapping refers to the process of mapping colors that cannot otherwise be reproduced by a target device. For example, a device may have the ability to display a range of colors. If the content, whether image or video, comprises colors outside the capability of the device, then those colors need to be mapped into the range that the device is capable of displaying. Therefore, the colors of the content are mapped to the gamut of the individual device.

The range of colors, or gamut, can be displayed in different ways. FIG. 1 illustrates the limits of a specific gamut as a grid (110). Some colors are outside the gamut (105), and are mapped to the grid (110) in order of being displayed by the device.

Classic gamut mapping algorithms can be defined as geometric operation. For example, 3b LCLIP preserves hue and lightness and can be implemented by calculating the intersection between the device gamut, represented as triangles, and a line from the out-of-gamut point to be mapped to the gray axis.

Other advanced gamut mapping algorithms, such as weighted-minimum-delta-E (WmindE), are not defined as geometric operation but as a distance metric in perceptually correlated lightness, chroma and hue.

A problem with existing minimum delta E methods is how the target device color volume is represented. Typically, these methods use a small number of triangles to sample the volume, due to memory limitations. The typically low number of triangles is 17×17×2×6=3468. When determining the minimum distance for an out of gamut (OOG) pixel to the gamut boundary, the algorithm of these methods calculates the distance to each triangle-face, triangle-line and triangle-vertice according to the distance metric. However, since gamut volumes tend to be non-linear in shape, this methodology results in colors less (or more) saturated then they could be as well as banding for smooth contours that span a vertex. Using non-linear interpolation (such as B-splines) that better fits the surface of the color volume would be one possible solution for this problem, however there is no closed form solution to find the nearest point on a B-spline surface.

The present disclosure addresses the issues described above. Ideally, the minimum distance would be computed for every single possible value of the gamut volume represented as a vertex on the color volume boundary. However, the number computed values would be too large to store for conventional computer systems. Considering that the outer surface of a color volume is a distorted version of the outer surface of the color space cube in RGB, it is apparent that the number of points to represent every possible RGB output value in the gamut surface is six times the area of one face. Each face has $2^N \times 2^N$ points, where N is the bit depth of the interface. Thus, the number of points needed to represent the 3D surface of an RGB gamut in a perceptual representation is $2^N \times 2^N \times 6$, or $2^{2N} \times 6$. For a 12 bit interface, this number constitutes over 100 million points, or about a hundred more than can be supported by typical memory footprints. To overcome this limitation the methods of the present disclosure first use a course sampling to find the region containing the optimal point, followed by a second fine sampling to refine the estimate to the exact point. This allows calculating the optimal solution without a need for interpolation, and with a reduced memory footprint.

Prior implementations of WmindE use either vertex, line and triangle based gamut representations, lookup tables or multi-step iterative approaches, as described in Morovic, Ján, and Pei-Li Sun, "Non-Iterative Minimum ΔE Gamut Clipping", Color and Imaging Conference, Vol. 2001, No. 1, Society for Imaging Science and Technology, 2001, the disclosure of which is incorporated herein by reference in its entirety.

Approaches that use a vertex, line and triangle based gamut hull representation can suffer from loss of tonal resolution or detail, because large areas of out-of-gamut (OOG) colors are mapped to the same in gamut (IG) color. This process is illustrated in FIG. 2.

Figure 2:
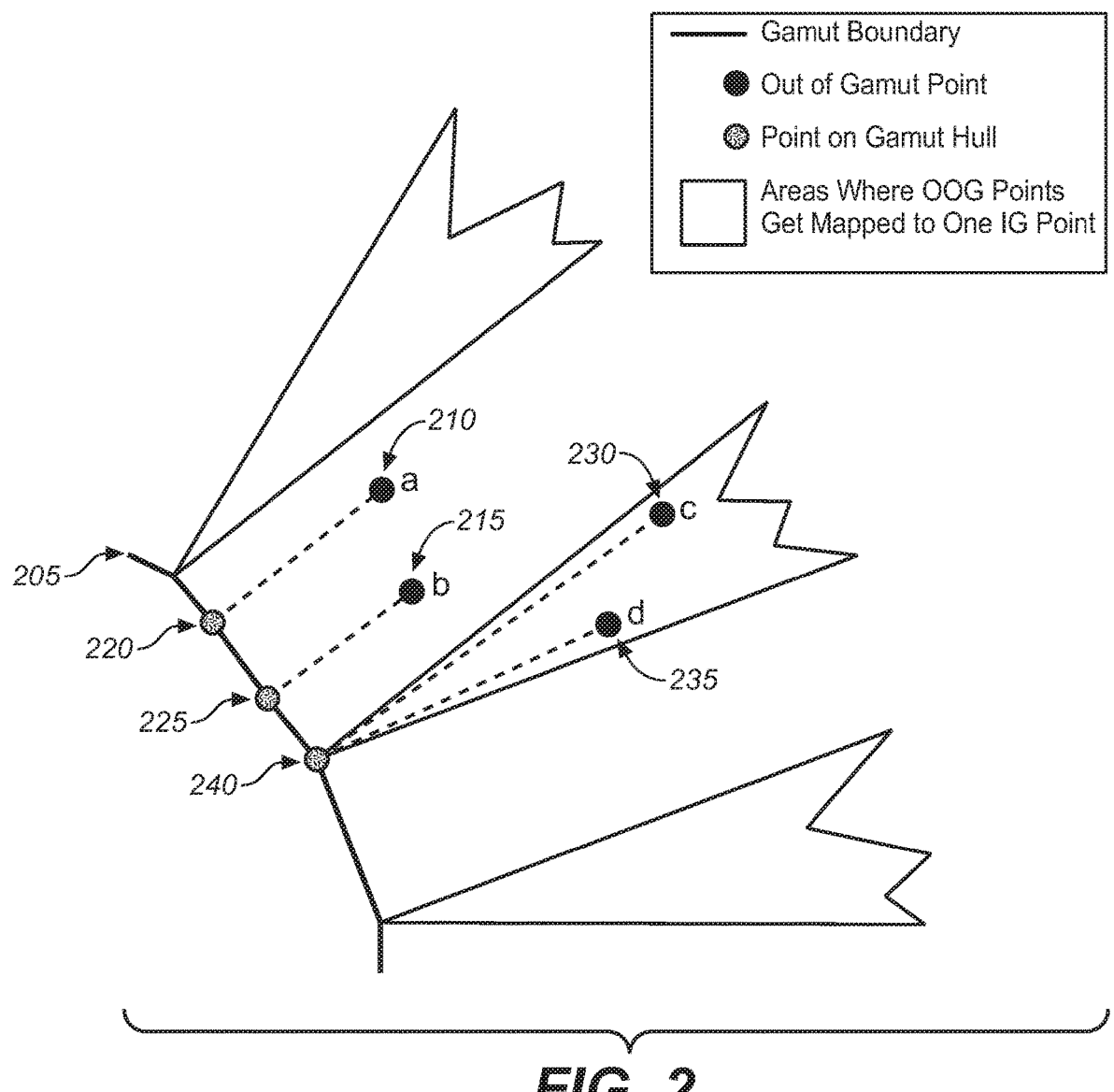
FIG. 2 illustrates an example of mapping pixels.

In FIG. 2, a line (205) represents the gamut boundary discretized to triangles. Colors outside the boundary (205), such as colors (210) and (215), are mapped onto the boundary. OOG colors a (210) and b (215) are mapped to different IG colors, (220) and (225), while OOG colors c (230) and d (235) are mapped to the same IG color (240). Therefore, any distinction between colors (230) and (235) is lost when the colors are mapped to the new gamut. This discontinuity can result in banding artifacts and loss of tonal details in smooth image areas.

Iterative approaches, on the other hand, are often slow and their run-time is not predictable because common implementations run until a certain convergence criterion is reached.

The present disclosure presents, instead, an n-step hierarchical approach that finishes within a predefined number of computing steps: Given a target color space (for example 8 bit RGB) all possible RGB values that lie on the gamut boundary are transformed to the gamut mapping color space, i.e. the input color space. To find the best gamut match for each pixel, first the value of a distance metric is calculated between said pixel and the transferred RGB input points, wherein the RGB input points are sampled according to a course grid. For example, in the 8 bit case and with n=2 (two step hierarchical) a 5 bit resolution results in 6 planes of 32×32 points each. In the next step of the method, the value of the distance metric is calculated for the neighborhood of each of the u points that resulted in the smallest distance metric value in the coarse sampling. For example the neighborhood of a coarse gamut hull point may comprise the nearest neighbor IG points.

Figure 3:
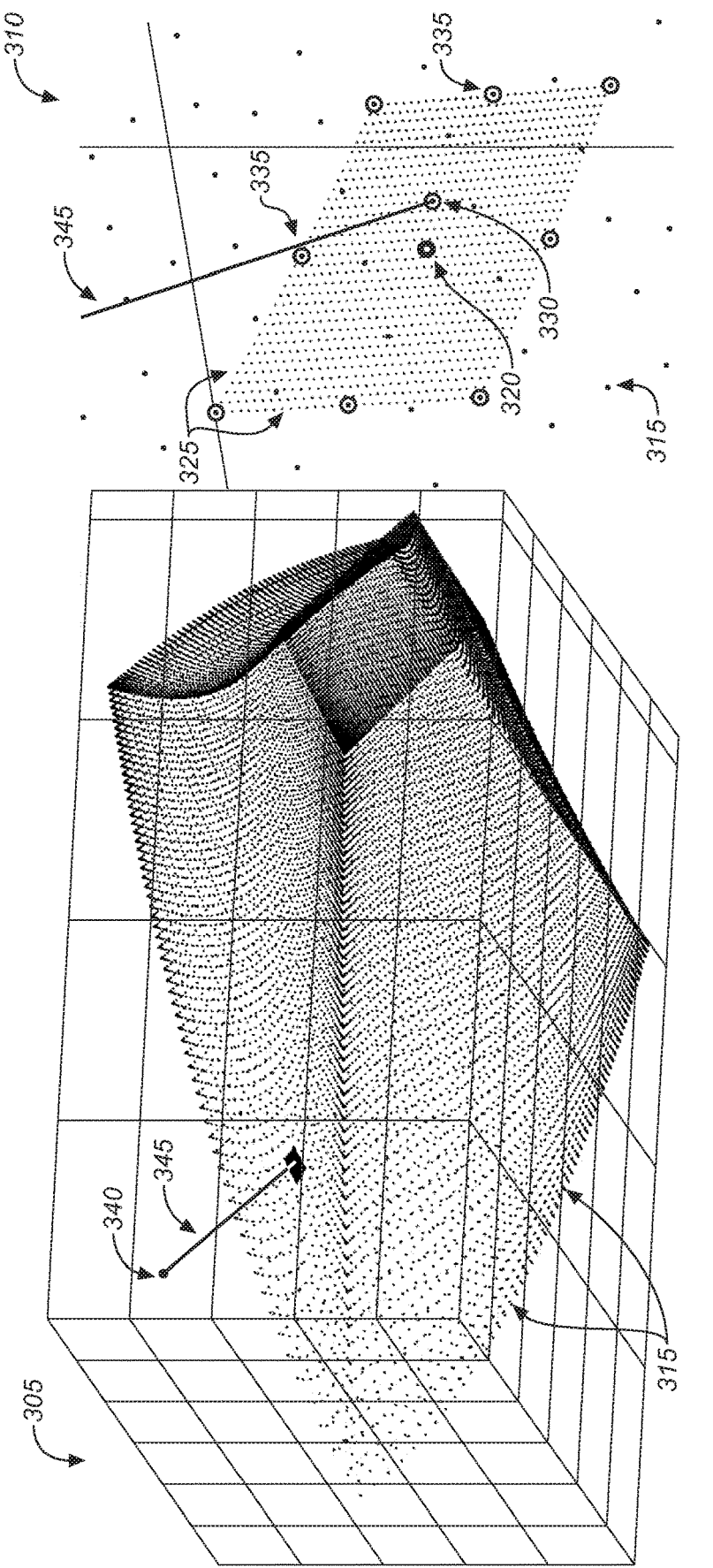
FIG. 3 illustrates a method for gamut mapping pixels with coarse and fine steps.

FIG. 3 illustrates an example for the color space sRGB, appearance model IPT-PQ, and n=2. As known to the person of ordinary skill in the art, sRGB is a color space that lies close to the center of the RGB color space. IPT is a color appearance model, a mathematical model that seeks to describe the perceptual aspects of human color vision. The IPT color appearance model is useful at providing a formulation for hue where a constant hue value equals a constant perceived hue independent of the values of lightness and chroma. The cones of the human eye that are sensitive to color have differing sensitivities to each of the primaries (red, green, and blue). As a result, a mathematically linear distribution of analyzed color is not necessarily the most accurate way to represent what is actually seen. The IPT model consists of linear transformations with additional nonlinear processing. In the IPT color space, I corresponds to the vertical axis of lightness (desaturated black to white) running through the center of the color space. The horizontal plane is defined by the P axis, which is the distribution of red to green, and the T axis, which is the distribution of yellow to blue. The IPT model's non linearity can be exchanged with the PQ non-linear encoding, therefore obtaining the perceptually quantized (PQ) IPT model, or IPT-PQ model. Perceptual correction of a color space can be carried out by analyzing the human perception of colors in the color space, for example through practical tests to detect the just noticeable difference (JND) between color shades. IPT-PQ can be well-suited for gamut mapping implementations. In some embodiments, a modified version of IPT-PQ is used as gamut mapping color space, i.e. input color space, and RGB as target color space. However, the methods described herein can be used with any typical gamut mapping color space, for example Lab, IPT or CIECAM02. In some embodiments, the IPT-PQ appearance model can be modified as described in PCT/US2015/051964, Encoding and Decoding Perceptually-Quantized Video Content, J. Froehlich et al., filed on 24 Sep. 2015 the disclosure of which is incorporated herein by reference in its entirety. In FIG. 3, the full color space is illustrated on left (305), while a detail view of the search area for the second step is illustrated on the right (310).

In FIG. 3, points (315) represent the coarse sampling, that is, the first iteration; point (320) represents one result of the first iteration; points (325) represent a fine sampling of the neighborhood of point (320), that is, the second iteration; point (330) represents the final result for the weighted-minimum-delta-E distance metric on the second iteration grid. Point (330) is mapped in the fine sampling gamut from OOG pixel (340). A value of a distance metric (345) between OOG point (340) and resultant point (330) can be calculated.

In other words, coarse sampling utilizes points (315) with a certain density. In the immediate neighborhood of point (320) it is possible to identify eight neighboring points (335). A finer sampling can be carried out with points (325), whose density is higher than that of points (315). The mapping process from OOG pixel (340) yields a resultant point (330), for which a value of a distance metric (345) can be calculated.

For an n=2 (two step) implementation of the above method, the following precision (m) can be used: for 8 bit, a first iteration of 5 bit; for 10 bit, a first iteration of 6 bit; for 12 bit, a first iteration of 7 bit. Other embodiments may comprise different values, for example n may be higher than 2 and different values of m may be used.

Figure 4:
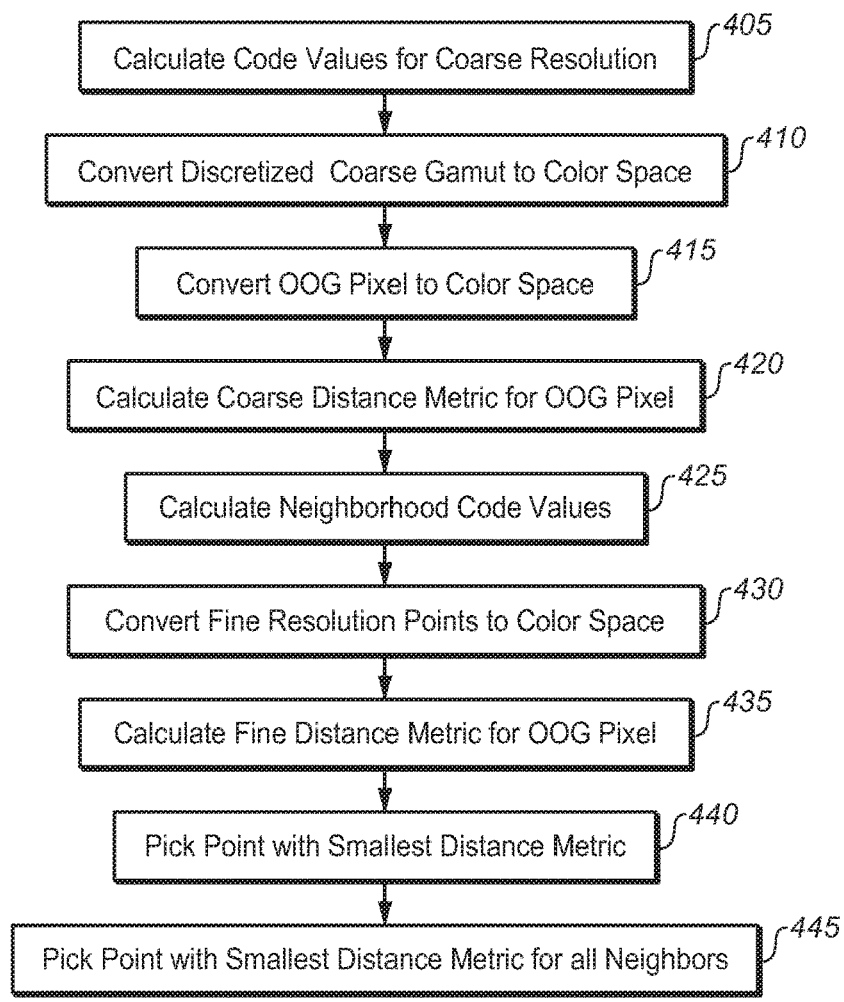
FIG. 4 depicts an exemplary flowchart for the methods of the present disclosure

The methods of the present disclosure may comprise the following steps, with reference to FIGS. 3 and 4. In a first step (405), the code values of the gamut hull are calculated for a coarse resolution, for example m-bit resolution. This coarse resolution corresponds to points (315). In some embodiments, all the code values are calculated. In a next step (410), the discretized coarse gamut hull is converted to the gamut mapping color space.

Subsequently, for an out of gamut (OOG) color pixel, such as pixel (340), the OOG pixel is converted to the gamut mapping color space (415). In some embodiments, each OOG color pixel is converted to the gamut mapping color space. A plurality of values of a distance metric (345, 420) for the current OOG pixel is then calculated. A value of the distance metric can be calculated from the current OOG pixel to the points of the coarse resolution gamut hull in the gamut mapping color space. In some embodiments, the value of the distance metric is calculated to every point of the coarse resolution gamut hull in the gamut mapping color space.

In a next step (425), for the u nearest in gamut (IG) points of the coarse resolution gamut hull, chosen based on the value of the distance metric, code values are calculated for the gamut hull in the neighborhood of the current in gamut point. For example, the u nearest IG points can be points (335). In some embodiments, the code values can be calculated for the points (325) that lay in the fine resolution gamut hull, delimited by the coarse resolution neighbors. In some embodiments, the code values are calculated for every point in the fine resolution gamut hull in the neighborhood of the current IG point. These points in the fine resolution gamut hull are then converted to the gamut mapping color space (430).

Fine distance metric values for the current OOG pixel are then calculated (435). These distance metric values can be calculated from the current OOG pixel to the points of the fine resolution gamut hull in the gamut mapping color space. In some embodiments, the fine distance metric value is calculated to every point of the fine resolution gamut hull in the gamut mapping color space. The point in the higher resolution gamut hull with the smallest fine distance metric to the OOG pixel is picked (440) as the mapped IG point of the OOG pixel. The value of the fine distance metric associated with the chosen point can also be saved for the subsequent calculations.

In other words, for an OOG pixel, a first coarse mapping is carried out with a first mapped point, subsequently, a neighborhood of points around this coarse mapped point is determined. A fine resolution gamut hull is defined around the coarse mapped point and distance metric values are calculated between these fine resolution gamut hull points and the OOG pixel. The point in the fine resolution gamut hull with the smallest distance metric value is chosen as the fine mapped point of the OOG pixel. This method differs from prior multi-step approaches by regularly sampling the target RGB space and transferring this sampling to the gamut mapping space instead of optimizing the sampling for uniformity in the mapping space.

The calculations above for the u nearest neighbors can be iterated for a different number u of neighbors. Again, the point in the fine resolution gamut hull with the smallest distance metric value is chosen. Subsequently, the points with the smallest distance metric value for different u neighbors can be compared and the point with the smallest distance metric value for all u neighbors is picked as the gamut mapped value of the OOG pixel.

In other embodiments, the coarse resolution neighbors in the coarse gamut hull are calculated for each OOG pixel under consideration. For each of the coarse resolution neighbors, a distance metric value is calculated, to the OOG pixel. Each of the coarse resolution neighbors is then considered in turn. For each of these coarse resolution neighbor points in the coarse gamut hull, a fine resolution grid of points is generated around it. The sampling of this grid is again determined regularly in the target RGB space and transferred back to the gamut mapping space. The fine resolution grid is the fine gamut hull. Therefore, a fine gamut hull is calculated for each of the coarse resolution neighbors. The distance metric value is calculated between each fine gamut hull point and the OOG pixel, for each of the coarse gamut hull points. In other word, the distance metric value for the fine gamut hull points around each coarse gamut hull neighbor is calculated, the process being iterated for the fine gamut hull points around each of the coarse gamut hull neighbors. A mapped point for the OOG pixel is then chosen, by finding the point in the fine gamut hull that has the smallest distance metric value, i.e. the smallest distance to the OOG pixel according the distance metric.

In some embodiments, the algorithm can be directly used to gamut-map images. Alternatively, a 3D-LUT can be generated for performing gamut mapping. The 3D-LUT can then be subsequently applied to the image to further save computation time. For the 3D-LUT, additional processing can be used to further refine the performance of the output LUT. For example, the output of the LUT can be processed with a 3D smoothening filter to reduce the difference between adjacent points. This smooths out sharp gradients that can cause issues for interpolation. The smoothing process can be applied to the whole LUT or just select portions (such as out of gamut pixels, individual hues, saturations or special colors). In some embodiments, the LUT comprises OOG LUT points, which are used to map OOG pixels in an image. The methods described herein can apply to the OOG LUT points of the LUT.

As described in the present disclosure, using a pre-quantized gamut hull and a multi-step hierarchical approach for gamut mapping presents a fast, precise and simple to implement algorithm compared to iterative approaches, or vertex, line and triangle based gamut hull representations.

Compared to iterative approaches as presented in Morovic et al. as cited above, the time for gamut mapping each pixel is constant and therefore predictable. Compared to approaches that use vertex, line and triangle based gamut hull representations the implementation of the gamut mapping algorithm does not introduce any additional loss of detail and tone-scale.

In some embodiments, the methods described in the present disclosure can be used to create an LUT, or can be applied concurrently with an LUT, or can be used as an alternative to a LUT to map out of gamut pixels. In some embodiments, the input pixels of the algorithm are LUT points, e.g. coordinates of a 3D LUT. In other embodiments, with a direct approach, the input pixels are from the image or video frame to be mapped. The OOG pixels are selected for mapping with the IG pixels are not processed as no mapping is needed. In some embodiments, the gamut hull is initialized by generating a 2D plane for each color channel, for a total of 6 planes. The gamut hull comprises all potential colors to map to, relative to the current OOG pixel under consideration for mapping. The optimized color to map to is decided by minimizing the distance metric value as described above. In some embodiments, the gamut hull is converted to a linear form for easier calculation. A first index is generated for the coarse iteration, while the non-OOG pixels are copied without processing and then OOG pixels are replaced according to the method described above in the present disclosure. In some embodiments, the weighted minimum delta-E mapping algorithm is used, however in other embodiments other mapping algorithm can be used. The coarse distance metric values are calculated, from the current OOG pixel to the coarse gamut hull points. For example, in some embodiments the 32 nearest points in the coarse gamut hull can be used to calculate the coarse distance metric value from the OOG pixel to each of the 32 nearest points. Subsequently, a neighborhood of fine gamut hull points is generated in the vicinity of each of the 32 nearest coarse points. A distance metric value is calculated for each of the fine gamut hull points. The smallest distance metric value is selected for mapping the OOG pixel.

The methods described in the present disclosure quantize according to a device dependent output space and therefore directly gain the best match gamut mapped values, without the need for variable run-time iterative approaches. The method described herein improve the operation of the computer as the computational resources, such as memory, required for gamut mapping are significantly decreased compared to other previously known methods.

In some embodiments, instead of a two-step approach with the calculation of a coarse resolution and a coarse distance metric value followed by the calculation of a fine resolution and fine distance metric value, a multiple-step approach can be carried out. For example, each step has increased resolution, and a distance metric value is calculated for each step, therefore obtaining an increasingly accurate determination for the IG point most closely corresponding to the OOG point.

In some embodiments, a three-step approach can be used. For example, a first distance metric value can be calculated, from the OOG point to a region of the gamut hull with a first bit resolution. Once a minimum first distance is found, the process can proceed to the second step. In the second step, a second region of the gamut hull is determined, around the point in the gamut hull with the minimum distance metric value calculated in the previous step; this second region has a higher bit resolution when compared to the region in the first step. A second distance metric value can be calculated, from the OOG point to the points in the second region of the gamut hull. In a third step, the previous process is repeated by determining a third region on the gamut hull, around the point with the closest distance metric value calculated in the second step. This third region has a higher bit resolution of the first and second regions. A third distance metric value can be calculated from the OOG point to the points in the third region of the gamut hull. This process can be extended to multiple steps, such as four or more steps.

The multiple-step process can be advantageous when the method is executed in a device with limited memory and computational power. The bit resolution for each step can be adjusted according to the computational resources available. A more powerful system may shorten the processing time by reducing the number of steps and increasing the resolution of each step, while a less powerful system may increase the number of steps and decrease the bit resolution of the gamut hull region in each step. For example, a first step may use a 6 bit resolution, a second step may have a 12 bit resolution and a third step may have a 14 bit resolution. Different bit resolution may be used according to the specific application.

In some embodiments, a first determination of which IG point corresponds to the OOG pixel can be carried out with a triangle approach. While triangle approaches, as discussed above in the present disclosure and illustrated in FIG. 2, have several disadvantages compared to the methods described herein, their application limited to the first steps, for example only to the first step, of the methods of the present disclosure may be useful in determining a first coarse IG point corresponding to the OOG pixel. For example, after a first application of the triangle approach, yielding a first coarse IG point for the OOG pixel, a grid can be determined around the coarse IG point, in the gamut hull, and a distance metric value can be calculated from the OOG pixel to the points in the gamut hull, as described above.

In some embodiments, the methods of the present disclosure are carried out through the following exemplary steps. An input image is provided, for example in the ICtCp color space or equivalent color space. The ICtCp color space is described, for example, in Report ITU-R BT.2390-0, High dynamic range television for production and international programme exchange, (2016), the disclosure of which is incorporated herein by reference in its entirety. In a subsequent step, ICtCp is converted to RGB based on the target display EOTF. EOTF stands for Electro-Optical Transfer Function and it describes how to turn digital code words into visible light. The conversion to RGB can be carried out through the following steps: i. Apply a 3×3 matrix to convert ICtCp to UM'S', where primes indicate nonlinearity; ii. Apply PQ curve to convert UM'S' to LMS; iii. Apply a 3×3 matrix to convert LMS to RGB (using target display RGB primaries); iv. Apply inverse EOTF to convert RGB to R'G'B' (using target display inverse EOTF, for example BT1886). LMS is a color space represented by the response of the three types of cones of the human eye, named after their responsivity at long, medium and short wavelengths.

Following the conversion to RGB or R'G'B', it is possible to calculate a mask M from any pixels where RGB or R'G'B' is <0 or >1. In a following step, it is possible to replace pixels in the mask M with the nearest in-gamut pixel as defined by the weighted-minimum-delta-E algorithm.

Alternately, the mask M can be computed after step iii, by comparing the linear RGB values with the target display minimum and maximum luminance (where RGB<Tmin or>Tmax).

In some embodiments, the coarse gamut hull is shaped as a polyhedron formed by 12 faces originating from the vector addition of a RGB and a white gamut hull. For example, the sRGB gamut hull consists of 6 planes while the RGB+White gamut hull consists of 12 planes.

In some embodiments, where the methods are applied to an LUT instead of directly to an image, providing the LUT comprises applying three- or four-dimensional filtering to the LUT prior to the providing. For example, filtering can be carried out by convolution or median filtering.

Figure 5:
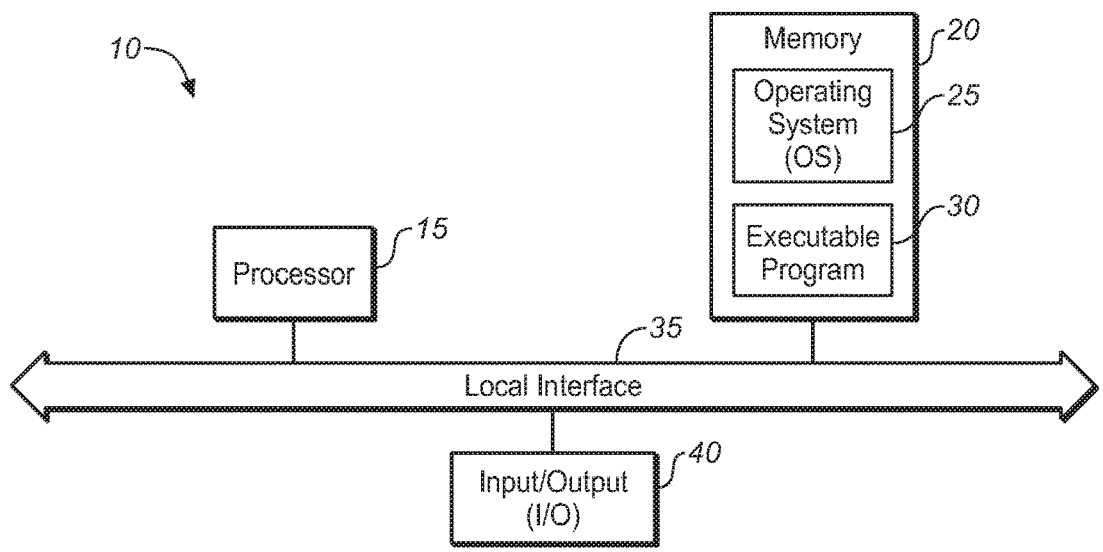
FIG. 5 depicts an exemplary embodiment of a target hardware for implementation of an embodiment of the present disclosure.

FIG. 5 is an exemplary embodiment of a target hardware (10) (e.g., a computer system) for implementing the embodiments of FIGS. 2-4. This target hardware comprises a processor (15), a memory bank (20), a local interface bus (35) and one or more Input/Output devices (40). The processor may execute one or more instructions related to the implementation of FIGS. 2-4, and as provided by the Operating System (25) based on some executable program (30) stored in the memory (20). These instructions are carried to the processor (15) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting data from a file stored on a hard disk, inputting commands from a keyboard, inputting data and/or commands from a touchscreen, outputting data to a display, or outputting data to a USB flash drive. In some embodiments, the operating system (25) facilitates these tasks by being the central element to gathering the various data and instructions required for the execution of the program and provide these to the microprocessor. In some embodiments the operating system may not exist, and all the tasks are under direct control of the processor (15), although the basic architecture of the target hardware device (10) will remain the same as depicted in FIG. 5. In some embodiments a plurality of processors may be used in a parallel configuration for added execution speed. In such a case, the executable program may be specifically tailored to a parallel execution. Also, in some embodiments the processor (15) may execute part of the implementation of FIGS. 2-4, and some other part may be implemented using dedicated hardware/firmware placed at an Input/Output location accessible by the target hardware (10) via local interface (35). The target hardware (10) may include a plurality of executable programs (30), wherein each may run independently or in combination with one another.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), a field programmable logic array (FPGA), a graphic processing unit (GPU) or a general purpose GPU).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

Various aspects of the present invention may be appreciated from the following enumerated example embodiments (EEEs).

EEE 1. A computer-implemented method comprising:
  providing, by a computer, an image comprising a plurality of pixels;
  determining for the plurality of pixels, by the computer, in gamut (IG) pixels and out of gamut (OOG) pixels, based on a gamut of a target device for displaying the image;

generating, by the computer, a coarse gamut hull comprising a coarse grid of IG points with m-bit resolution, wherein m is an integer number;

calculating, by the computer, a coarse distance metric for at least one OOG pixel, the coarse distance metric being between the OOG pixel and a plurality of coarse gamut hull points in the coarse grid of IG points;

among the plurality of coarse gamut hull points, calculating, by the computer, u coarse gamut hull points having a shorter distance metric to the OOG pixel than other coarse gamut hull points of the plurality of coarse gamut hull points, wherein u is an integer number;

for each of the u coarse gamut hull points, generating, by the computer, a fine gamut hull comprising a fine grid of IG points in a neighborhood of each of the u coarse gamut hull points, the fine grid having a q bit resolution, wherein q is an integer number higher than m;

calculating, by the computer, a fine distance metric for the at least one OOG pixel, the fine distance metric being between the OOG pixel and a plurality of fine gamut hull points in the fine grid of IG points;

calculating, by the computer, a shortest distance metric among the calculated fine distance metrics; and gamut mapping, by the computer, the at least one OOG pixel to a IG pixel based on the calculated shortest distance metric.

EEE 2. The method of EEE 1, wherein the plurality of coarse gamut hull points comprises all coarse grid IG points.

EEE 3. The method of EEE 1, wherein u=32.

EEE 4. The method of EEE 1, wherein the plurality of fine gamut hull points comprises all fine grid IG points.

EEE 5. The method of EEE 1, wherein the calculated fine distance metrics comprise all fine distance metrics for all u coarse gamut hull points.

EEE 6. The method of EEE 1, wherein generating, by the computer, a coarse gamut hull comprises converting the coarse gamut hull to a gamut mapping color space.

EEE 7. The method of EEE 6, wherein determining for the plurality of pixels, by the computer, OOG pixels comprises converting the OOG pixels to the gamut mapping color space.

EEE 8. The method of EEE 7, wherein calculating, by the computer, a coarse distance metric is carried out in the gamut mapping color space.

EEE 9. The method of EEE 8, wherein generating, by the computer, a fine gamut hull comprises converting the fine gamut hull to the gamut mapping color space.

EEE 10. The method of EEE 9, wherein calculating, by the computer, a fine distance metric is carried out in the gamut mapping color space.

EEE 11. The method of EEE 10, further comprising displaying the image within the gamut of the target device, the displayed image comprising the at least one gamut mapped OOG pixel.

EEE 12. The method of EEE 11, wherein the gamut mapping color space is IPT-PQ.

EEE 13. The method of EEE 12, wherein gamut mapping is carried out with a WmindE mapping algorithm.

EEE 14. The method of EEE 1, further comprising:
generating, by the computer, a finer gamut hull comprising a finer grid of IG points with p-bit resolution, wherein p is an integer number higher than q; and
calculating, by the computer, a finer distance metric for the at least one OOG pixel, the finer distance metric being between the OOG pixel and a plurality of finer gamut hull points in the finer grid of IG points,
wherein the calculating, by the computer, the shortest distance metric is among the calculated finer distance metrics.

EEE 15. The method of EEE 14, further comprising:
generating, by the computer, additional gamut hulls of IG points having increasing bit resolutions; and
calculating, by the computer, additional distance metrics for the at least one OOG pixel between the OOG pixel and the additional gamut hulls,
wherein the calculating, by the computer, the shortest distance metric is among the calculated additional distance metrics.

EEE 16. A computer-implemented method comprising:
providing, by a computer, an image comprising a plurality of pixels;
providing, by a computer, a look-up-table (LUT) for a target device for displaying the image, the LUT comprising a plurality of LUT vertices to be mapped;
determining for the plurality of LUT vertices, by the computer, in gamut (IG) LUT vertices and out of gamut (OOG) LUT vertices, based on a gamut of a target device for displaying the image;
generating, by the computer, a coarse gamut hull comprising a coarse grid of IG points with m-bit resolution, wherein m is an integer number;
calculating, by the computer, a coarse distance metric for at least one OOG vertex, the coarse distance metric being between the OOG vertex and a plurality of coarse gamut hull points in the coarse grid of IG points;
among the plurality of coarse gamut hull points, calculating, by the computer, u coarse gamut hull points having a shorter distance metric to the OOG vertex than other coarse gamut hull points of the plurality of coarse gamut hull points, wherein u is an integer number;
for each of the u coarse gamut hull points, generating, by the computer, a fine gamut hull comprising a fine grid of IG points around each of the u coarse gamut hull points, the fine grid having a q bit resolution, wherein q is an integer number higher than m;
calculating, by the computer, a fine distance metric for the at least one OOG vertex, the fine distance metric being between the OOG vertex and a plurality of fine gamut hull points in the fine grid of IG points;
calculating, by the computer, a shortest distance metric among the calculated fine distance metrics;
gamut mapping, by the computer, the at least one OOG vertex to a IG vertex based on the calculated shortest distance metric;
gamut mapping, by the computer, at least one OOG pixel of the image based on the at least one gamut mapped OOG vertex of the LUT; and
displaying, by the computer, the image within the gamut of the target device, the displayed image comprising the at least one gamut mapped OOG pixel.

EEE 17. The method of EEE 16, wherein the plurality of coarse gamut hull points comprises all coarse grid IG points.

EEE 18. The method of EEE 16, wherein u=32.

EEE 19. The method of EEE 16, wherein the plurality of fine gamut hull points comprises all fine grid IG points.

EEE 20. The method of EEE 16, wherein the calculated fine distance metrics comprise all fine distance metrics for all u coarse gamut hull points.

EEE 21. The method of EEE 1, where positions of the plurality of coarse and fine gamut hull points are determined by:

sampling a regular grid of points on six surfaces of a cube-shaped gamut in a RGB target color space; and transferring values of the sampled points to a gamut mapping space.

EEE 22. The method of EEE 21, wherein the coarse gamut hull is shaped as a polyhedron formed by 12 faces originating from a RGB and a white gamut hull.

EEE 23. The method of EEE 16, wherein providing the LUT comprises applying three- or four-dimensional filtering to the LUT prior to the providing.

EEE 24. The method of EEE 23, wherein the filtering comprises convolution or median filtering.

The invention claimed is:

1. A computer-implemented method for gamut mapping from a gamut mapping color space to a target color space, the method comprising:
   providing, by a computer, an image in the gamut mapping color space, the image comprising a plurality of pixels;
   determining for the plurality of pixels, by the computer, out-of-gamut (OOG) pixels, based on a gamut of a target device;
   generating, by the computer, a coarse gamut hull comprising IG points in a course grid having an m-bit resolution, wherein m is an integer number, the course grid being a regular grid defined in the target color space;
   converting, by the computer, the coarse gamut hull to the gamut mapping color space;
   calculating, by the computer, for at least one OOG pixel a plurality of values of a coarse distance metric between the at least one OOG pixel and each of a plurality of coarse gamut hull points in the coarse grid of IG points, wherein calculating the coarse distance metric values is carried out in the gamut mapping color space;
   among the plurality of coarse gamut hull points, calculating, by the computer, u coarse gamut hull points having a smaller coarse distance metric value than other coarse gamut hull points of the plurality of coarse gamut hull points, wherein u is an integer number;
   for each of the u coarse gamut hull points, generating, by the computer, a fine gamut hull comprising IG points in a neighborhood of each of the u coarse gamut hull points, in a fine grid having a q bit resolution, wherein q is an integer number higher than m, the fine grid being a regular grid in the target color space;
   converting, by the computer, the fine gamut hull to the gamut mapping color space;
   calculating, by the computer, for the at least one OOG pixel a plurality of values of a fine distance metric between the at least one OOG pixel and each of a plurality of fine gamut hull points in the fine grid of IG points, wherein calculating the fine distance metric values is carried out in the gamut mapping color space;
   calculating, by the computer, a smallest distance metric value among the calculated fine distance metric values; and
   gamut mapping, by the computer, the at least one OOG pixel to an IG pixel based on the calculated smallest distance metric value.

2. The method of claim 1, wherein the plurality of coarse gamut hull points comprises all coarse grid IG points of a boundary of the gamut of the target device.

3. The method of claim 1, wherein u=32.

4. The method of claim 1, wherein the plurality of fine gamut hull points comprises all fine grid IG points of a boundary of the gamut of the target device.

5. The method of claim 1, wherein the calculated fine distance metric values comprise all fine distance metric values for all u coarse gamut hull points.

6. The method of claim 1, wherein the target device is a device for displaying the image, the method further comprising displaying the image within the gamut of the target device, the displayed image comprising the at least one gamut mapped OOG pixel.

7. The method of claim 6, wherein the gamut mapping color space is IPT-PQ, or gamut mapping is carried out with a weighted-minimum-delta-E mapping algorithm, or both.

8. The method of claim 1, further comprising:
   generating, by the computer, a finer gamut hull comprising a finer grid of IG points with p-bit resolution, wherein p is an integer number higher than q; and
   calculating, by the computer, for the at least one OOG pixel a plurality of values of a finer distance metric between the at least one OOG pixel and a plurality of finer gamut hull points in the finer grid of IG points, wherein the calculating, by the computer, the smallest distance metric value is among the calculated finer distance metric values.

9. The method of claim 8, further comprising:
   generating, by the computer, additional gamut hulls of IG points having increasing bit resolutions; and
   calculating, by the computer, additional distance metric values between the at least one OOG pixel and the additional gamut hulls,
   wherein the calculating, by the computer, the smallest distance metric value is among the calculated additional distance metrics.

10. A computer-implemented method for generating a look-up-table (LUT) for gamut mapping images from a gamut mapping color space to a target color space, the method comprising:
   providing, by a computer, a LUT for a target device, the LUT comprising a plurality of LUT points in the gamut mapping color space to be mapped to the target color space;
   determining for the plurality of LUT points, by the computer, out-of-gamut (OOG) LUT points, based on a gamut of the target device;
   generating, by the computer, a coarse gamut hull comprising IG points in a course grid having an m-bit resolution, wherein m is an integer number, the course grid being a regular grid defined in the target color space;
   converting, by the computer, the coarse gamut hull to the gamut mapping color space;
   calculating, by the computer, for at least one OOG LUT point a plurality of values of a coarse distance metric between the at least one OOG LUT point and each of a plurality of coarse gamut hull points in the coarse grid of IG points, wherein calculating the coarse distance metric values is carried out in the gamut mapping color space;
   among the plurality of coarse gamut hull points, calculating, by the computer, u coarse gamut hull points having a smaller coarse distance metric value than other coarse gamut hull points of the plurality of coarse gamut hull points, wherein u is an integer number;
   for each of the u coarse gamut hull points, generating, by the computer, a fine gamut hull comprising IG points in a neighborhood of each of the u coarse gamut hull points, in a fine grid having a q bit resolution, wherein q is an integer number higher than m, the fine grid being a regular grid defined in the target color space;

converting, by the computer, the fine gamut hull to the gamut mapping color space;

calculating, by the computer, for the at least one OOG LUT point a plurality of fine distance metric values between the at least one OOG LUT point and a plurality of fine gamut hull points in the fine grid of IG points, wherein calculating the fine distance metric values is carried out in the gamut mapping color space;

calculating, by the computer, a smallest distance metric value among the calculated fine distance metric values;

gamut mapping, by the computer, the at least one OOG LUT point to an IG point based on the calculated smallest distance metric value; and generating the look-up-table (LUT) for gamut mapping by including the IG point as value of the at least one OOG LUT point.

11. The method of claim 10, further comprising:
providing, by a computer, an image comprising a plurality of pixels; and
gamut mapping, by the computer, at least one OOG pixel of the image based on the generated LUT, wherein:
the target device is a device for displaying the image and the method further comprises displaying, by the computer, the image within the gamut of the target device, the displayed image comprising the at least one gamut mapped OOG pixel.

12. The method of claim 10, where positions of the plurality of coarse and fine gamut hull points are determined by:
sampling a regular grid of points on six surfaces of a cube-shaped gamut in a RGB target color space; and
transferring values of the sampled points to a gamut mapping space.

13. The method of claim 12, wherein the coarse gamut hull is shaped as a polyhedron formed by 12 faces originating from a RGB and a white gamut hull.

14. The method of claim 10, wherein providing the LUT comprises applying three- or four-dimensional filtering to the LUT prior to the providing, wherein the filtering comprises convolution or median filtering.

15. A non-transitory computer-readable storage medium having stored thereon computer-executable instructions for executing a method in accordance with claim 1.

16. An apparatus comprising one or more computers configured to implement claim 1 by one or more processors.

* * * * *